CARRIER-WAVE TELEPHONE SYSTEM

Filed Jan. 23, 1952 2 Sheets-Sheet 1

INVENTOR
Hendrik Nicolaas Hansen
By [signature]
Agent

April 23, 1957 H. N. HANSEN 2,790,029

CARRIER-WAVE TELEPHONE SYSTEM

Filed Jan. 23, 1952 2 Sheets-Sheet 2

INVENTOR
Hendrik Nicolaas Hansen
By [signature]
Agent 2,790,029
Patented Apr. 23, 1957

2,790,029

CARRIER-WAVE TELEPHONE SYSTEM

Hendrik Nicolaas Hansen, Hilversum, Netherlands, assignor, by mesne assignments, to North American Philips Company, Inc., New York, N. Y., a corporation of Delaware Application January 23, 1952, Serial No. 267,855

Claims priority, application Netherlands February 23, 1951

1 Claim. (Cl. 179—15)

Figures 1A, 1B, 1C:
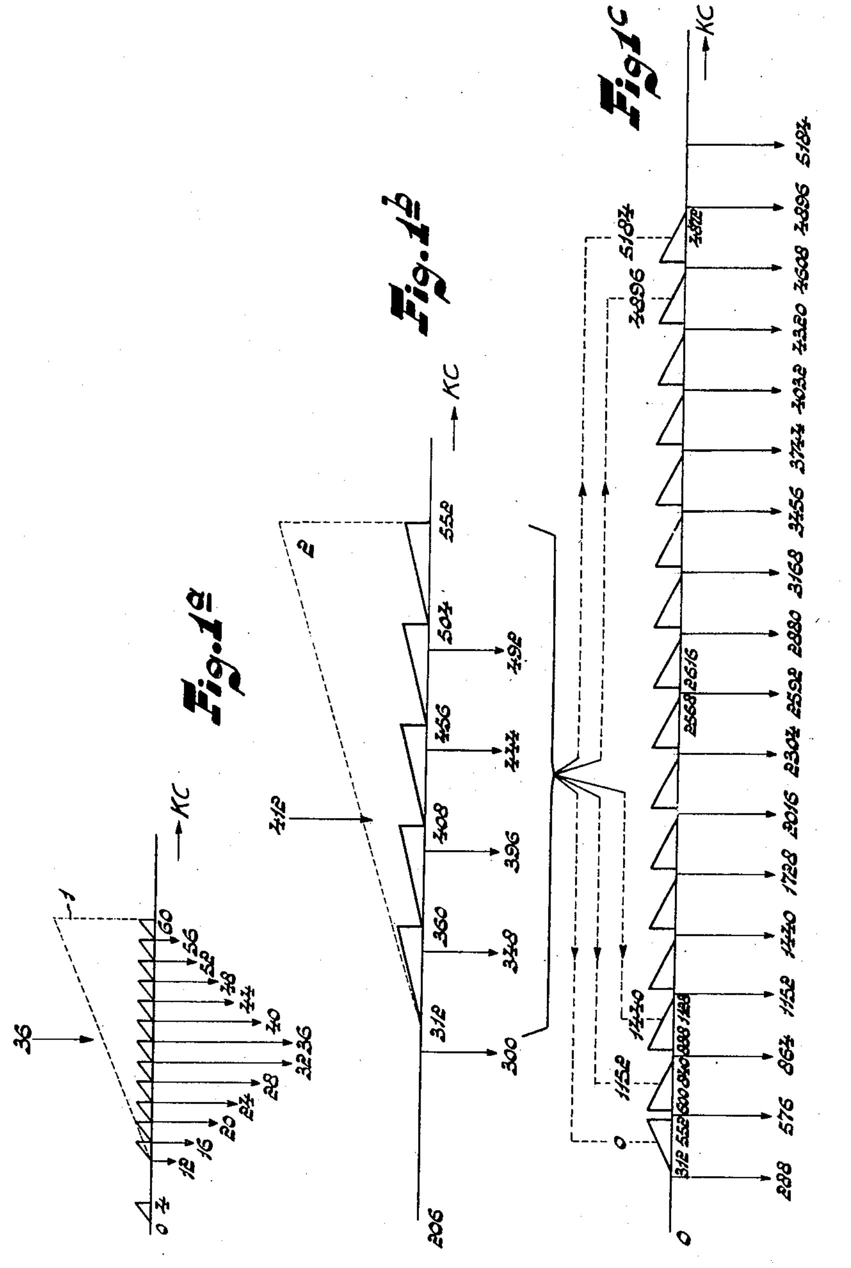

The invention relates to carrier-wave telephone systems wherein a number of channels are transmitted simultaneously and wherein a number of pilot signals are transmitted at the same time.

"Pilot signals" are to be understood to mean signals which are not used for the transmission of intelligence but are used either individually or in combination for the control, maintenance or automatic of non-automatic improvement of the transmission quality.

In conventional carrier-wave telephone systems, the frequencies of such pilot signals, in so far as they fall within the telephone frequency band which is finally transmitted, create undesirable operational problems for two different reasons.

First, the frequency separation between these pilot signals and the frequency ranges of the telephone signals which are to be transmitted, such as groups or super-groups, is too small to be easily filtered out or suppressed. Consequently, the shunting of one or more groups or super-groups, if the frequencies of these pilot signals are adjacent to the frequencies of these groups or super-groups, becomes extremely complicated.

Secondly, these pilot signal frequencies generally do not exhibit a simple relationship with the frequencies of the carrier-waves to be transmitted, so that the carrier-wave supply apparatus becomes more complex.

Because of the above reasons, a minimum number of pilot signals is generally used and the transmission quality suffers accordingly.

In the present invention, a novel carrier-wave telephone system which mitigates the aforesaid disadvantage is used. This invention has the feature that a number of carrier-waves falling within the telephone band which is to be finally transmitted and which lie in frequency ranges which are not used for the telephone transmission are used as pilot signals.

The invention is of particular importance for those carrier-wave telephone systems wherein the transmitted frequency band has a large bandwidth, as is the case, for example, in connections through coaxial cables and in which a large number of partially unsupervised amplifying stations are used. In these systems a large number of pilot signals is required for monitoring, and so forth.

According to a further feature of the invention, in a single-band carrier-wave telephone system wherein the channels are arranged in a number of groups, the channels of each group are spread with the use of channel modulators in the group frequency band (basis group), a number of groups are spread with the use of group modulators in a super-group (basis super-group), and these super groups are spread with the use of a number of super-group modulators in a hyper-group (basis hyper-group), the sum of the extreme frequencies of a basis super-group is an odd multiple of the greatest common divisor of a number of super-group carrier-wave frequencies, and the frequencies of at least part of the pilot signals to be transmitted are equal to multiples of the greatest common divisor of these super-group carrier-wave frequencies.

Figure 2:
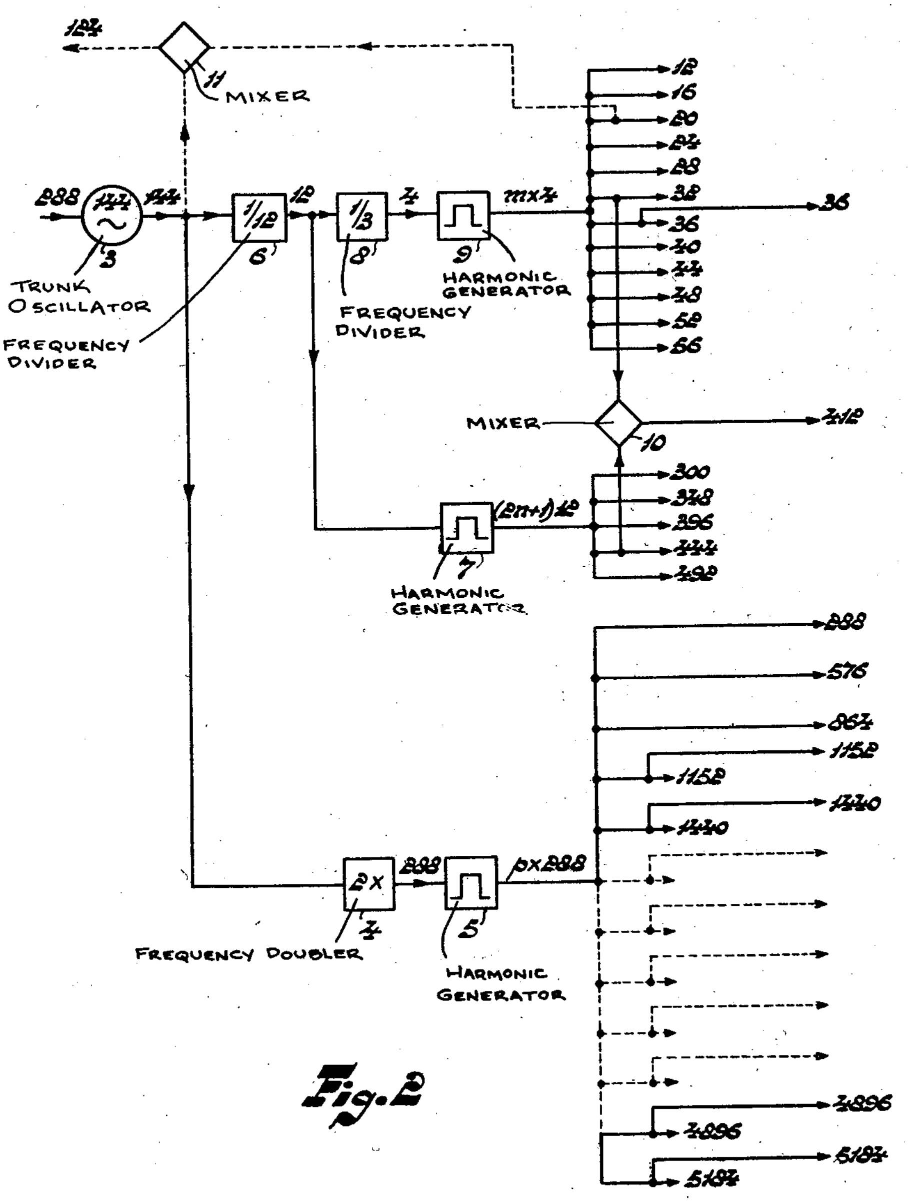

In order that the invention may be more clearly understood and readily carried into effect, it will now be described more fully with reference to the accompanying drawing, in which:

Fig. 1 shows a frequency diagram of one embodiment of the system according to the invention; and Fig. 2 shows a carrier-wave supply system suitable for use in the system shown in Fig. 1.

Referring to Fig. 1*a* a channel to be transmitted extends from 0 to 4 kcs./s.; twelve of these channels are modulated on twelve carrier-waves of from 12 to 56 kcs./s., having a frequency difference of 4 kcs./s. After the lower side-bands have been filtered out, the upper side-bands are used to form the basis group 1, which extends from 12 to 60 kcs./s.

In Fig. 1*a* an additional arrow indicates that the channel carrier-wave having a 36 kcs./s. frequency is also used as a pilot signal for the group.

In the second modulation phase, five groups as indicated in Fig. 1*a* are modulated on carrier-waves which exhibit a frequency difference of 48 kcs./s. between adjacent waves and which extend in frequency from 300 to 492 kcs./s.

After the undesired lower side-bands have again been filtered out, the basis super-group 2 shown in Figs. 1*b* is formed and extends from 312 to 552 kcs./s.

In Fig. 1*b* an arrow indicates that the super-group pilot frequency is 412 kcs./s.

It should be noted that both the group pilot signal and the super-group pilot signal do not serve to determine the quality of the transmission proper, since they only control portions of the output apparatus contained in the receiving apparatus.

Sixteen super-groups as indicated in Fig. 1*b* are now shifted in a third modulation phase to their position in the basis hyper-group indicated in Fig. 1*c*.

The lowest super-group of the basis hyper-group extends from 312 to 552 kcs./s., as this group has not been displaced. This is indicated by the mark 0 on the broken line between this super-group and the basis super-group indicated in Fig. 1*b*.

The second super-group of the hyper-group is obtained by shifting the basis super-group indicated in Fig. 1*b* by means of a super-group carrier-wave of 1152 kcs./s.

The upper side-band thus obtained is then suppressed and the lower side-band occupies the lower side-band position in the hyper-group band of 600 to 840 kcs./s.

The second super-group carrier-wave frequency is 1440 kcs./s. This second wave is used to shift the third super-group into its place of 888 to 1128 kcs./s. in a similar manner.

Each super-group carrier-wave frequency exceeds the frequency of the preceding wave by 288 kcs./s.

Thus the highest super-group of the hyper-group is shifted into pos'tion by means of a carrier-wave having a frequency of 5184 kcs./s.

The largest common denominator of these super-group carrier-wave frequencies extending from 1152 to 5184 kcs./s. is 288 kcs./s. which is equal to the frequency separation between adjacent waves.

The sum of the end frequencies of 312 and 552 kcs./s. for the basis super-group is equal to 864, which is an odd multiple, i. e. the treble of 288.

Since the bandwidth of a super-group is 240 ksc./s. and the frequency difference between adjacent super-group carrier-waves is 288 kcs./s., the frequency spacing between successive super-groups in the hyper-group is 48 kcs./s.

Since the sum of the end frequencies of the basis super-group is an odd multiple of the greatest common denominator of the super-group carrier-wave, the frequency interval between the first and the second super-groups is also 48 kcs./s. In addition, the various super carrier-waves are exactly located in the center of the frequency interval between the super-groups.

The extreme frequency values of a few super-groups are indicated in the figure for the sake of clarity. It is also indicated, for example, that the highest frequency of the eighth super-group is 2568 kcs./s., the lowest frequency of the ninth super-group being 2616 kcs./s.

The frequency of the intermediate super-group carrier-wave which is used to shift the seventh super-group into its place in the hyper-group, is 2592 kcs./s., so that this carrier-wave is exactly located in the center of the frequency interval between the eighth and the ninth super-group.

In Fig. 1*c* the signals having frequencies of 288, 576 and 864 kcs./s., which do not serve as super-group carrier-wave frequencies, are also indicated.

The frequency of the first signal represents the largest common denominator of the super carrier-wave frequencies and the two other signals are represented by the second and the third harmonics of this signal.

The frequency difference from the adjacent super-groups of the hyper-group for these three frequencies is 24 kcs./s.

These three signals as well as the super-group carrier-waves may now be transmitted as pilot signals. In this case, the super carrier-waves of from 1152 to 4896 kcs./s. consequently occupy a space within the telephone frequency band to be ultimately transmitted, but these waves do not lie in frequency ranges used for telephone transmission, since they are outside the super-groups.

It will be obvious that additional carrier-wave supply apparatus is not required for the generation of pilot frequencies, since these frequencies are already available. Since the frequency intervals between the super-groups are larger and the frequency intervals between the super-groups and the adjacent pilot signals are larger, super-group separation as well as filtering out or suppression of pilot signals may be accomplished in a less costly manner than with the systems hitherto used.

However, for the transmission of a plurality of channels, the required bandwidth is larger in the present invention than with known systems due to the difference of 48 kcs./s. between the super-groups. Consequently, the distance between the amplifiers if transmission is to be along a coaxial cable, must be approximately 5 to 12% smaller for the same amplification factor, than with the existing systems, but on the other hand the structure of the system is simplified.

It should be noted for the sake of completeness that if the loss in bandwidth is considered to be too large and fewer pilot signals are required, or if for some of these pilot signals large frequency difference from adjacent super-groups is not required, one or more of these super-groups may be completed by a number of additional channels, which may, for example, be accomplished by using two basis super-groups having a different number of channels.

The relative bandwidth, which is approximately 66 in a known system comprising sixteen super-groups in a hyper-group wherein the lowest super-group extending from 60 to 300 kcs./s. is only about 16 in the embodiment shown in the figure.

Since in the present system, a large number of pilot signals is obtained in a simple manner, improved synchronization of the trunk oscillators on the transmitter and the receiver side of a connection for automatic control in non-supervised amplifying stations, for equalization purposes, for maintenance measurements, for alarming, for locating disturbances and for measuring in the tranmission circuit and so forth is easily obtained.

Since a large number of pilot signals is available, linearity measurements may be carried out quite simply with the use of combination of two pilot signals. It will be obvious that, in this case, the other pilot signals whose frequencies are equal to the frequencies of a potential combination tone, must not be transmitted.

Although the diagram shown in Fig. 1 refers to only three modulation phases, the system may be extended in a very simple manner.

In the subsequent modulation usually only two hyper-groups are combined, each of the hyper-groups then comprising six, seven or eight super-groups.

If two hyper-groups of eight super-groups each are formed, the first hyper-group may, for example, extend from 288 to 2592 kcs./s. and the second from 2880 to 5184 kcs./s. a super-group being, consequently, left out in the space between 2592 and 2880 kcs./s. and a super-group being added to the space between 4872 and 5184 kcs./s. in order to facilitate filtering.

5472 kcs./s., which is also a multiple of 288 kcs./s., may now be chosen for the hyper-group carrier-wave frequency.

Fig. 2 illustrates diagrammatically the generation of the various required voltages.

The frequency of the trunk oscillator 3, which is constituted by a crystal oscillator, is 144 kcs./s. as this frequency can more easily be generated by precision crystals than 288 kcs./s.

The super-group carrier-waves have frequencies which are multiples of 288 kcs./s.; they are obtained by supplying the output voltage of the trunk oscillator 3 to a frequency doubler 4. A harmonic generator 5 is connected to the doubler 4 and generates harmonics therefore.

The multiples of 288 kcs./s. are taken through filters (not shown) from the output of generator 5.

Those alternating voltages which may be used both for super-group carrier-waves and for pilot signals, are marked by a branched arrow, while those which may be used only as pilot signals are marked by a long arrow.

A dividing stage 6, in which frequency division takes place with a factor 12, is arranged after the trunk oscillator 3.

The output voltage of 12 kcs./s. frequency from this stage 6 is supplied to a harmonic generator 7 whose output yields the group of carrier-waves whose frequencies range from 300 to 492 kcs./s.

The output voltage of the dividing stage 6 is also supplied to an additional dividing stage 8 wherein the frequency is divided by 3.

The output voltage of 4 kcs./s. frequency from the dividing stage 8 is supplied to an additional harmonic generator 9.

The channel carrier-wave, extending from 12 to 56 ksc./s. frequency are taken from generator 9.

The 36 kcs./s. channel carrier-wave also serves as the group pilot signal.

The super-group pilot signal whose frequency is 412 kcs./s. is obtained from a mixing stage 10, to which are supplied the 32 kcs./s. channel carrier-wave and the 444 kcs./s. group carrier-wave.

The trunk oscillator 3 may be synchronized by the 288 kcs./s. pilot frequency.

If the present system must be integrated with a system according to the CCIF directions wherein a 124 kcs./s. oscillator is used, this oscillator may be synchronized in the manner shown in broken lines.

The 144 kcs./s. output voltage of the trunk oscillator 3 is mixed in the mixing stage 11 with a 20 kcs./s. channel carrier-wave to produce a 124 kcs./s. output voltage which is used for synchronization.

What I claim is:

A carrier-wave telephony system for the simultaneous transmission within a given frequency band of a plurality of channels arranged within groups, each channel occupying a given frequency range, comprising means to convey intelligence signals within each of said channels, means to modulate each channel of a group with a separate first carrier-wave to form basis groups from said groups, said first waves differing in frequency, means to modulate each basis group with a separate second carrier-wave to form basis super-groups having predetermined identical bandwidths from said basis groups, said second waves differing in frequency and having a largest common denominator, the sum of the lowest and highest frequencies falling within the predetermined bandwidth of any basis super-group being equal to an odd integral multiple of said common denominator, means to modulate each basis super-group with a separate third carrier-wave to form a basis hyper-group from said basis super-groups, said third waves differing in frequency, means to derive first, second and third pilot signals from one of said first, second and third carrier-waves respectively, the frequencies of at least some of these pilot signals being equal to integral multiples of said common denominator, and means to transmit said basis hyper-group and said pilot signals within said given frequency band, said pilot signals being separated in frequency from the intelligence signals contained in the modulated channels.

References Cited in the file of this patent

UNITED STATES PATENTS

| | | |
|---|---|---|
| 2,188,500 | Curtis | Jan. 30, 1940 |
| 2,274,535 | Dixon | Feb. 24, 1942 |
| 2,300,415 | Green | Nov. 3, 1942 |
| 2,329,519 | Dixon | Sept. 14, 1943 |